_United States Patent Office_

3,294,738
Patented Dec. 27, 1966

3,294,738
METHOD FOR MAKING ARYLSILSESQUIOXANE LADDER POLYMERS
Karl W. Krantz, Schenectady, N.Y., assignor to General Electric Company, a corporation of New York
No Drawing. Filed Dec. 23, 1963, Ser. No. 332,947
5 Claims. (Cl. 260—46.5)

This invention relates to organopolysiloxanes, especially the production of arylsilsesquioxane polymers, particularly phenylsilsesquioxane polymers, containing silicon-bonded hydroxy radicals.

The arylsilsesquioxane polymers, such as those used in the present invention, are distinguished by their structure which resembles that of a ladder. The $RSiO_{1.5}$ units are arranged in a structure which may be represented as

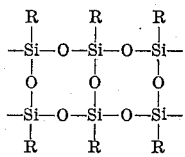

The polymers are thus characterized by recurring units of the formula:

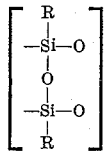

They may therefore be called arylsilsesquioxane ladder polymers, and the term ladder polymer will be used throughout this specification to describe the arylsilsesquioxanes of the present invention. The aryl group, which is designated by R in the above formulae, may be, for example, phenyl, cyanophenyl, benzoylphenyl, paraphenoxyphenyl, tolyl, xylyl, ethylphenyl, naphthyl, biphenyl, etc.

Arylsilsesquioxane ladder polymers have previously been shown, for example, in the patents to Sprung et al., 3,017,385, and Brown et al., 3,017,386, assigned to the same assignee as the present invention. While the chain length, and thus the intrinsic viscosity of these polymers have varied over wide ranges, in each case the chain was terminated by essentially unreactive groups, particularly the arylsilsesquioxane group themselves. Thus, the previous ladder polymers were unusable, or only difficulty usable, as intermediates in the formation of other resinous polymers containing the arylsilsesquioxane ladder unit as an integral part.

By comparison with the ladder polymers of the prior art the organopolysiloxanes of the present invention, having silanol chain terminals, may be reacted with other materials to form new chemical compositions containing the arylsilsesquioxane unit as an integral part. Further, they may be self-condensed to form arylsilsesquioxane polymers similar to those described in the prior art, but capable of greater control in formation and greater utility.

Previously, a method has been shown for forming high molecular weight ladder polymers through the agency of an alkali catalyst. Due to the retention of a portion of the alkali catalyst, such ladder polymers undergo a downward reequilibration of molecular weight in dilute solutions, even when the solution is anhydrous. This is a consequence of the dependence of the equilibrium molecular weight distribution on siloxane concentration; it may be regarded as simply the reverse of the polymerization process which forms the high molecular weight ladders. While the reaction employed in the subject invention also acts to reduce the molecular weight of the arylsilsesquioxane ladder polymer, both the process and the ultimate product are different. The downward reequilibration involves the production of shorter ladder chains by the action of the remaining alkali catalyst. The resultant product is chemically the same as the initial ladder polymer, but differs in that fewer silicone units are present in any given chain. On the other hand, the process of the present invention, while also shortening the chain length of the ladder, does so by introducing hydroxyl groups along the original polymer chain, the hydroxyl groups acting to terminate the newly formed chain. Thus, the new product differs not only in molecular weight from the original ladder polymer, but in chemical constituency as well.

It is therefore, one object of this invention to produce arylsilsesquioxane polymers having silicon-bonded hydroxyl chain terminals.

It is a further object of this invention to produce arylsilsesquioxane polymer units having great utility as intermediates in the production of other synthetic polymers.

Briefly, this invention involves the hydrolysis of arylsilsesquioxane ladder polymers, particularly phenylsilsesquioxane polymers, to produce shorter chain length arylsilsesquioxane ladder polymers having silicon-bonded hydroxyl chain terminals. The reaction is accomplished by dissolving the non-reactive ladder polymer in a material which acts as a cosolvent for the polymer and for water, and by treating the solvent solution with water and a basic catalyst to cause the introduction of hydroxyl radicals into the ladder polymer. The new hydroxyl-terminated ladder polymers have an intrinsic viscosity in benzene at 25° C. of at least 0.05 dl./g., e.g., from 0.05 to 1.0 dl./g., and preferably from 0.05 to 0.5 dl./g. These polymers are soluble in both benzene and toluene.

The process and product of the present invention will now be described in greater detail.

In order to carry out the hydrolysis reaction it is necessary to provide a material which is a solvent both for the arylsilsesquioxane ladder polymer and for water. Solvents which have been found to accomplish this purpose include tetrahydrofuran, pyridine, and any monomethyl or dimethyl pyridine. Additionally, lower molecular weight non-reactive ladder polymers may be dissolved in a broader range of solvents as the solubility of ladder polymers increases with decreasing intrinsic viscosity. For example, the hydrolysis reaction may be accomplished in a solvent such as dioxane, pyrrole, the dimethyl ester of diethylene glycol, or an ethylene glycol monoethyl ether such as Cellosolve, for non-reactive ladder polymers having intrinsic viscosities of up to about 1.0 dl./g. At least about 10 parts of solvent should be used for each part ladder polymer to be reacted as at least that amount is required to obtain a workable solution. However, the reaction rate is proportional to the concentration of the polymer, among other factors.

With respect to catalyst, basic catalyst which aid in breaking the chain structure of the arylsilsesquioxane polymers, in general, are usable for the introduction of hydroxyl groups into such polymers. However, the relative effectiveness of such catalysts in breaking the bond in the chain, as opposed to breaking the bond between opposite silicon atoms in the double chain, varies considerably. There is a correlation between the selectivity of hydroxyl placement and the cleavage rate which the catalyst effects and between the cleavage rate and the basicity of the catalyst. As greater selectivity is obtained with a lower cleavage rate, the preferred catalysts are those having a lower basicity. Catalysts which may be described as having a low basicity, and which are preferred for the process utilized in the present invention, are those which are considered primarily condensation catalysts. While essentially all Lewis bases will act as catalysts in the process, those which act as reequilibration and cleavage catalysts, being more basic, are less selective. A Lewis base is defined as a substance which can donate an electron pair.

The use of potassium hydroxide as a catalyst for increasing the intrinsic viscosity and therefore the chain length, of arylsilsesquioxane polymers was disclosed in the aforementioned Brown et al. patent. At the conclusion of that polymerization process, a small quantity of potassium hydroxide remains in the product polymer. As potassium hydroxide has an equilibrating effect on organopolysiloxane polymers, the residual potassium hydroxide in the arylsilsesquioxane polymers produced by the process of Brown et al. may be sufficient, in some cases, to act as the catalyst in the present hydrolysis process. However, when using potassium hydroxide as a catalyst, though the chain ends are hydroxylated, there is considerable cleavage of the bonds between opposite silicon atoms in the parallel chains so that a number of hydroxyl units are present along the chain length, in addition to those present at the chain terminals. Similar results are obtained using other reequilibration and cleavage catalysts, such as other alkali metal hydroxides and the substituted oniums.

The chain end directing properties of various amines have been found to be quite effective in forming the product of the present invention. Illustrative amines are primary, secondary and tertiary amines such as piperidine, 1,4-diazobicyclo (2,2,2) octane, triethanolamine, tetramethylguanidine, ethylenediamine, and cyclohexylamine. In particular, piperidine and 1,4-diazabicyclo (2,2,2) octane have been found to be especially effective. The amount of catalysts used in the process ranges from about 0.05 to 20 parts by weight amine catalyst per part of the ladder polymer.

While the amount of water which must be used in the hydrolysis reaction is not critical, an amount equal to 2 or 3 times the stoichiometric minimum should be used to provide adequate contact between the water and the non-hydroxylated ladder polymer. The amount of water can be increased to accelerate the rate of reaction. The only limitation upon the amount of water which can be used as a maximum is that the total system remain as one phase; that is, that it not go beyond the cloud point of the system. The cloud point is determined not only by the solvent which is used for the reaction, but additionally by the concentration of the ladder polymer, the amount of catalyst used, the intrinsic viscosity of the ladder polymer, and the reaction temperature maintained. In other words, the maximum amount of water which can be used is dependent upon the system, rather than upon any particular factor which constitutes the system. In many systems, the cloud point is reached at from about 1 to 5% water. A representative example of a system at the cloud point is the following: 20 grams of ladder polymer having an intrinsic viscosity in benzene at 25° C. of 5.11 dl./g.; 500 ml. tetrahydrofuran; 20 ml. water and 10 gm. piperidine.

The length of the ultimate ladder polymers, and consequently the percentage of hydroxyl groups present on such polymers, is dependent not only upon the chain length of the initial arylsilsesquioxane polymer, but additionally, upon the temperature and length of time the polymer is allowed to remain in contact with the water and hydrolysis catalyst. Further, the reaction rate is dependent upon the strength of the catalyst utilized. The longer the time that the non-reactive polymer is contacted by the water and catalyst, and/or the higher the basicity of the catalyst, the shorter the chain length produced, and consequently, the larger the percentage of hydroxyl groups present. The initial ladder polymers utilized have an intrinsic viscosity in benzene at 25° C. of at least 0.1 dl./g., while the hydroxyl-terminated products have an intrinsic viscosity, under the same conditions, of at least 0.05 dl./g. Non-hydroxyl-terminated ladder polymers having intrinsic viscosities up to 6.0 dl./g. may be utilized to form the products of the present invention.

The hydrolysis process involves dissolving the non-reactive arylsilsesquioxane ladder polymer in a solvent which is also a solvent for water and, if the polymer has not been decatalyzed, an acid. This acid should be one which is strong enough to neutralize the remaining base, but not strong enough to be a catalyst; that is, the acid should be a weak acid. Representative of such weak acids are glacial acetic acid, citric acid, and boric acid. The catalyst and water, dissolved in the same solvent as the polymer, are added to the polymer solution under strong agitation. The reaction is allowed to take place at room temperature, or somewhat higher, for a predetermined period of time after which a weak acid, similar to that described above, is added. A water-immiscible solvent for the product, such as benzene, is added to the reaction mixture which is then poured into a large volume of water, thus acting to extract the water-miscible solvent. The water-immiscible solvent layer should be further washed with a dilute aqueous acid solution, if the reaction solvent was of an amine variety. In any event, the water-immiscible layer is further washed with water to remove the remaining catalyst, leaving a water immiscible solvent solution of the silanol-stopped arylsilsesquioxane polymer. The product may be precipitated with methanol for further purification and removal of excessively degraded ladder segments.

As previously mentioned the polymers of the present invention have intrinsic viscosities of from about 0.05 to 0.5 or 1.0 dl./g. and have the configuration corresponding to the formula:

(1) 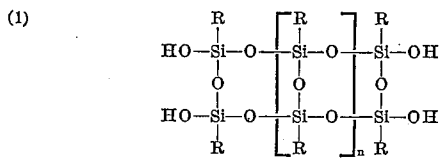

where R is aryl as previously defined and $n$ has a value sufficiently high to provide the above intrinsic viscosity, which is generally a value of from about 25 to 300 or 500. Thus, each end of the ladder polymer is terminated by hydroxyl groups. Additionally, a very low percentage of hydrovyl groups may be distributed along the chain due to the cleavage of the bonds between opposite silicon atoms in the parallel ladder chains. The amount of chain hydroxylation, as opposed to chain terminated hydroxylation, is in large part dependent upon the catalyst utilized and constitutes an extremely small amount when the preferred catalysts of the present invention are utilized. Thus, the minimum hydroxyl content present in the polymers of the present invention may be determined from a hydroxyl-terminated polymer having an intrinsic viscosity of 1.0 dl./g. A phenysilsesquioxane with an intrinsic viscosity of 1.0 dl./g. has a molecular weight of about 107,000 so that four hydroxyl terminal groups constitute a hydroxyl percentage of 0.016. On the other hand, a short chain hydroxyl-terminated phenyl ladder polymer, as one having an intrinsic viscosity in benzene of 0.05 dl./g., has a minimum hydroxyl percentage of 0.97, such a polymer having a molecular weight of approximately 7,000.

In order that those skilled in the art may better understand the present invention, the following examples are given by way of illustration, and should not be construed as limiting in any way. All parts are by weight.

*Example I*

Crude phenylsilsesquioxane ladder polymer having a weight of 1 gram, and containing about 500 p.p.m. potassium hydroxide, was dissolved in 15 ml. of pyridine which had been dried with a molecular sieve. The polymer had an intrinsic viscosity in benzene at 25° C. of 3.5 dl./g. Under vigorous agitation 2 ml. of distilled water were added to the solution. In about 1 to 2 seconds this system became clear and homogeneous. The reaction mixture was split into a number of portions, each of which was treated with glacial acetic acid in order to neutralize the caustic catalyst. The neutralizations were carried out at different times to determine the effect of residence time on hydroxyl introduction. In each case the product had the configuration of Formula 1, where R is phenyl. The following table indicates the intrinsic viscosity, approximate molecular weight of the polymer and the value of $n$ in Formula 1 at various time intervals between the introduction of water and the introduction of acetic acid:

| Portion | Time | Intrinsic Viscosity in Benzene at 25° C. in dl./g. | Approximate Molecular Weight | $n$ |
| --- | --- | --- | --- | --- |
| 1 | 5 minutes | 0.33 | 44,000 | 170 |
| 2 | 17 hours | 0.21 | 31,000 | 120 |
| 3 | 41 hours | 0.14 | 22,500 | 87 |

Thus, as shown by the above table, a large drop in the intrinsic viscosity is evidenced shortly after addition of water to the ladder polymer. The viscosity continues to drop, though at a slower rate, as long as the polymer is left in contact with the catalyst and water. The materials produced were tested for solubility and found to be soluble in both benzene and toluene. The presence of silanol was determined by infrared spectra, namely, silanol bands at 2.75 microns, increasing in intensity from portion 1 to portion 3. Strong absorbence was also present at 8.8 and 9.55 microns, the absorption bands characteristic of the ladder polymer. Thus, the ladder structure is shown to be largely preserved in the silanolated polymer.

*Example II*

This example demonstrates that the hydrolysis may be effected by a very low concentration of an alkali metal hydroxide, but that while hydroxyl termination is achieved a severe degree of chain hydroxylation also occurs. Thus, the preferability of the amine catalysts is demonstrated. One gram of phenyl ladder polymer having a potassium content (expressed as KOH) of less than 10 parts per million and having an intrinsic viscosity in benzene at 25° C. of 1.86 dl./g. was dissolved in 50 ml. of pyridine. A mixture of 79 ml. pyridine and 1 ml. water was added to 20 ml. of the ladder polymer solution. Thus, the mixture contained 0.40 g./dl. of polymer and 1.00 g./dl. of water. Portions of this reaction mixture were periodically stopped with a drop of acetic acid and the intrinsic viscosity and approximate molecular weight measured. These are shown in the table below.

| Time, Minutes | Intrinsic Viscosity in Benzene at 25° C. dl./g. | Approximate Molecular Weight |
| --- | --- | --- |
| 0 | 1.86 (by extrapolation) | 175,000 |
| 13 | 1.68 | 160,000 |
| 19 | 1.65 | 157,000 |
| 22 | 1.62 | 155,000 |
| 111 | 1.12 | 116,000 |
| 116 | 1.10 | 115,000 |
| 174 | 0.96 | 103,000 |
| 311-315 | 0.77 | 88,000 |
| 1,329 | 0.40 | 52,000 |
| 1,440 | 0.37 | 48,500 |

The rate of complete chain scission in this example was lower than in Example I, probably due to the lower working concentrations of components and catalyst. An additional factor would be the hydroxylation along the chain in competition with the breaking of the chain. The percentage of hydroxyl radicals present was determined to be lower than in Example I which is consistent with the higher intrinsic viscosities of the hydroxyl-terminated product material. Again, infrared studies showed the prominent double siloxane bands of the ladder structure. However, further studies showed that there was considerable hydroxylation along the polymer structure, as well as the presence of hydroxyl groups at the chain terminals. As with the product of Example I, the products produced in this example were soluble in both benzene and toluene.

*Example III*

In this example one of the preferred amine catalysts, namely piperidine, was used for hydroxyl introduction. Hydroxyl terminals were found, but little if any chain hydroxylation was detected. A phenylsilsesquioxane ladder polymer (10.0 gm.) having an intrinsic viscosity in benzene at 25° C. of 3.5 dl./g. was dissolved in a premix of 500 ml. tetrahydrofuran and 1.0 ml. glacial acetic acid. As the ladder polymer retained a portion of the original potassium silanolate polymerization catalyst, glacial acetic acid was used to inactivate it. A mixture of 40 ml. distilled water and 15 gm. piperidine, dissolved in 100 ml. tetrahydrofuran, was added to the polymer solution under strong agitation. A temporary precipitate disappeared in less than 30 seconds, and the system thereafter remained clear. After 20 minutes at 22–24° C., the hydrolysis was "stopped" by adding 30 ml. glacial acetic acid. Immediately, 100 ml. benzene was added and the clear reaction mixture was poured into about a liter of water. The upper layer was washed with dilute aqueous citric acid and with water to remove the piperidine and potassium salts and most of the tetrahydrofuran. The product was precipitated from the benzene solution with methanol for further purification and removal of excessively degraded low fractions. The yield was 97% of theoretical and showed an intrinsic viscosity in benzene at 25° C. of 0.37 dl./g. The product was soluble in both benzene and toluene. This product corresponds to Formula 1 where R is phenyl and $n$ is 190.

*Example IV*

A phenylsilsesquioxane ladder polymer (20.0 gm.), having an intrinsic viscosity in benzene at 25° C. of 5.11 dl./g. after a xylene extraction to remove the light ends, was dissolved in 500 ml. tetrahydrofuran and 1 ml. glacial acetic acid, the latter used to neutralize residual potassium ions. At room temperature, a premix of 50 ml. tetrahydrofuran, 20 ml. distilled water, and 10.0 gm. piperidine was added to the ladder polymer solution. A floc appeared only momentarily and then redissolved followed by a visible, rapid drop in solution viscosity. Four aliquots were removed from the main solution and were stopped by the addition of 5 ml. glacial acetic acid at varying times from the beginning of the hydrolysis reaction. To each of the aliquots was added 100 ml. benzene, after which each aliquot was washed twice with 1,000 ml. of water to remove the tetrahydrofuran. The hydroxylated polymer was precipitated by adding approximately 250 ml. methanol to 125 ml. of the benzene solution under vigorous agitation. The precipitates were dried and the yield percentage, intrinsic viscosity, and approximate molecular weight, and value of $n$ in Formula 1 were determined, as shown in the table below.

| Aliquot Number | Time of Reaction, Minutes | Yield, Percent | Intrinsic Viscosity in Benzene at 25° C. dl./g. | Approximate Molecular Weight | $n$ |
| --- | --- | --- | --- | --- | --- |
| 1 | 10 | 98.5 | 0.98 | 105,000 | 410 |
| 2 | 20 | 98.2 | 0.60 | 72,000 | 280 |
| 3 | 40 | 96.5 | 0.35 | 47,000 | 182 |
| 4 | 60 | 95.0 | 0.25 | 36,000 | 140 |

The product of aliquot 1 was a tough, fibrous material, while each of the others was weaker and more easily disintegrated. All of the aliquot products were completely soluble in toluene.

*Example V*

A solution comprising 200 g. of the same 3.5 dl./g. ladder polymer as in Example III, 100 ml. of tetrahydrofuran and 3 drops glacial acetic acid was prepared. To a 25 ml. aliquot of this solution was added a premix of 15 ml. THF, 2.00 ml. distilled water and 1.00 g., 1,4-diazobicyclo (2,2,2) octane. After a transitory haze the system remained clear and homogeneous. After 3 hours at 25° C., one half of the hydrolysis mixture was diluted with benzene, washed and the product isolated by methanol precipitation as in Example III. The yield was 97.5% of the theoretical and the polymer had an intrinsic viscosity in benzene at 25° C. of 0.25 dl./g. After 6 hours at 25° C. total reaction time, the second half of the hydrolysis mixture was similarly treated and gave a 95.8% yield of polymer of intrinsic viscosity in benzene at 25° C. of 0.20 dl./g. Both products were soluble in benzene and toluene.

The silanolated ladder polymer produced by the process of the present invention has been found to be useful as an intermediate in the in situ production of longer chain ladder polymers, similar to the starting material for the products of the present invention, but allowing greater control in use and being more easily employable. Additionally, the hydroxyl-terminated ladder polymers have been found to be extremely useful for reaction with organic compounds, particularly with other organosilicon compounds. These processes, and the products thereof, are described and claimed in the copending applications of Karl W. Krantz, Serial Nos. 332,897, 332,948, and 332,853, filed concurrently herewith and assigned to the same assignee as the present invention. Further, the new polymers of the present invention are useful in themselves as they are more thermoplastic and provide greater adhesion to coated substrates than the nonreactive ladder polymers of the prior art.

While specific embodiments of the invention have been shown and described, the invention should not be limited to the specific methods and materials shown. It is intended, therefore, to cover all modifications within the spirit and scope of this invention by the appended claims.

What I claim as new and desire to secure by Letters Patent of the United States is:

1. A process comprising hydrolyzing a polymer having the structural formula,

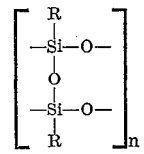

where R is an aryl radical, and $n$ has a value of at least 25, said polymer having an intrinsic viscosity in benzene at 25° C. of at least 0.1 dl./g., said hydrolysis being carried out in a solvent solution, said solvent acting as a cosolvent for both said polymer and water, in the presence of water and a basic amine catalyst.

2. The process of claim 1 wherein the solvent is tetrahydrofuran.

3. The process of claim 1 wherein the solvent is pyridine.

4. The process of claim 1 wherein the catalyst is piperidine.

5. The process of claim 1 wherein the catalyst is 1,4-diazabicyclo (2,2,2) octane.

References Cited by the Examiner

UNITED STATES PATENTS

| | | | |
|---|---|---|---|
| 2,913,471 | 11/1959 | George et al. | 260—448.2 |
| 3,000,858 | 9/1961 | Brown | 260—46.5 |
| 3,017,385 | 1/1962 | Sprung et al. | 260—46.5 |
| 3,017,386 | 1/1962 | Brown et al. | 260—46.5 |
| 3,046,294 | 7/1962 | Pike | 260—46.5 |
| 3,162,614 | 12/1964 | Katchman | 260—448.2 |
| 3,167,555 | 1/1965 | Farkas et al. | 260—79 |
| 3,170,894 | 2/1965 | Brown et al. | 260—46.5 |
| 3,175,994 | 3/1965 | Katchman et al. | 260—46.5 |

OTHER REFERENCES

Meals et al.: "Silicones," Reinhold Publ. Corp., New York, 1959, pages 116–7.

Sprung et al.: "The Hydrolysis of n-Amyltriethoxysilane and Phenyltriethoxysilane," Journal of Polymer Science, vol. 28, pages 17–34 (1958).

LEON J. BERCOVITZ, *Primary Examiner.*

M. I. MARQUIS, *Assistant Examiner.*